(12) United States Patent
Vaughan et al.

(10) Patent No.: US 8,745,175 B2
(45) Date of Patent: Jun. 3, 2014

(54) AUTOMATIC APPLICATION PROVISIONING

(75) Inventors: Gregory Bjorn Vaughan, Santa Cruz, CA (US); Gregory Burns, Los Altos, CA (US); Kazuhisa Yanagihara, Cupertino, CA (US); Eric Zelenka, Bend, OR (US)

(73) Assignee: Apple Inc., Cupertino, CA (US)

( * ) Notice: Subject to any disclaimer, the term of this patent is extended or adjusted under 35 U.S.C. 154(b) by 655 days.

(21) Appl. No.: 11/462,593

(22) Filed: Aug. 4, 2006

(65) Prior Publication Data

US 2008/0034068 A1    Feb. 7, 2008

(51) Int. Cl.
*G06F 15/16* (2006.01)
*G06F 15/177* (2006.01)
*G06F 15/173* (2006.01)

(52) U.S. Cl.
USPC ........... 709/220; 709/206; 709/207; 709/221; 709/222; 715/205; 715/221; 715/227; 715/239

(58) Field of Classification Search
USPC ......... 709/218, 219, 220, 221, 223, 222, 228; 705/10; 707/9, 10
See application file for complete search history.

(56) References Cited

U.S. PATENT DOCUMENTS

| | | | | |
|---|---|---|---|---|
| 6,263,369 | B1 * | 7/2001 | Sitaraman et al. | 709/225 |
| 6,519,638 | B1 * | 2/2003 | Forman et al. | 709/224 |
| 6,687,733 | B2 * | 2/2004 | Manukyan | 709/200 |
| 7,089,297 | B1 * | 8/2006 | Salas et al. | 709/220 |
| 7,577,742 | B1 * | 8/2009 | Prohofsky | 709/226 |
| 2002/0032768 | A1 * | 3/2002 | Voskuil | 709/224 |
| 2002/0095499 | A1 * | 7/2002 | Barnett et al. | 709/226 |
| 2003/0200285 | A1 * | 10/2003 | Hansen et al. | 709/220 |
| 2005/0060416 | A1 * | 3/2005 | Kabir et al. | 709/227 |
| 2005/0131898 | A1 * | 6/2005 | Fatula, Jr. | 707/8 |
| 2006/0069981 | A1 * | 3/2006 | Enenkiel | 715/500 |
| 2007/0113066 | A1 * | 5/2007 | Samba et al. | 713/1 |
| 2007/0283011 | A1 * | 12/2007 | Rakowski et al. | 709/225 |

OTHER PUBLICATIONS https://www.microsoft.com/en-us/news/press/2003/jul03/07-02idmanagementrtm2003pr.aspx "Microsoft Identity Integration Server 2003"—Microsoft, Jul. 2003.*

* cited by examiner

*Primary Examiner* — Randy Scott
(74) *Attorney, Agent, or Firm* — Fish & Richardson P.C.

(57) ABSTRACT

User preferences and configuration information are determined automatically when a user account is created. The configuration information is derived from service configuration files. The user account and configuration information is stored in a directory such that it is accessible by a client and applied to applications executing on the client.

18 Claims, 6 Drawing Sheets

AUTOMATIC APPLICATION PROVISIONING

TECHNICAL FIELD

The disclosed implementations relate to provisioning an electronic device.

BACKGROUND

Provisioning an electronic device (e.g., a computer) encompasses everything from setting up accounts (e.g., for network access) and creating data structures (e.g., home folders), to fine-tuning the user experience by managing preferences and settings for users, groups, and the like. In a managed environment, such as a corporate network, modern operating systems includes user management tools that are used to create and manage accounts, share points, and network views. When managing accounts, administrators may define account settings such as name, password, home folder locations, and group membership. Preferences may be defined that customize a user's experience, granting or restricting access to his or her own computer'settings and to network resources.

Many services are often made available to users, such as e-mail, chat, etc., that are accessed using applications that execute on the user's client computer. The client computer applications may require manual configuration to access services. The configuration process can be confusing for users, because it may include the input of network addresses and resources into obscure configuration menus. Further, manual configuration adds a burden on administrators because preferences may need to be defined in advance for many users, and each user may have unique configuration parameters based on location, installed applications, available services, etc.

SUMMARY

Disclosed herein are systems and methods for provisioning user preferences and application configuration information.

In an exemplary implementation, a user record is created in response to the creation of a user account. Configuration information for services and client applications are associated with the user account based on predetermined service configuration files. The configuration information is tailored to each user and is appended to a user record associated with the user account. The user record may be stored in a directory.

In another exemplary implementation, a client application requests configuration information from a directory and copies ti to a client device. Applications running on the client device then access services based on the retrieved configuration information.

In another implementation, a system includes a central configuration utility that automatically provisions configuration information for user accounts that are stored in a directory. A client manager reads the configuration information and applies the configuration information to client applications. The client manager can periodically access the directory to determine if modifications have been made to the configuration information and update the client applications based on the modifications.

The details of one or more implementations are set forth in the accompanying drawings and the description below.

DESCRIPTION OF DRAWINGS

Like reference symbols in the various drawings indicate like elements.

DETAILED DESCRIPTION

Figure 1:
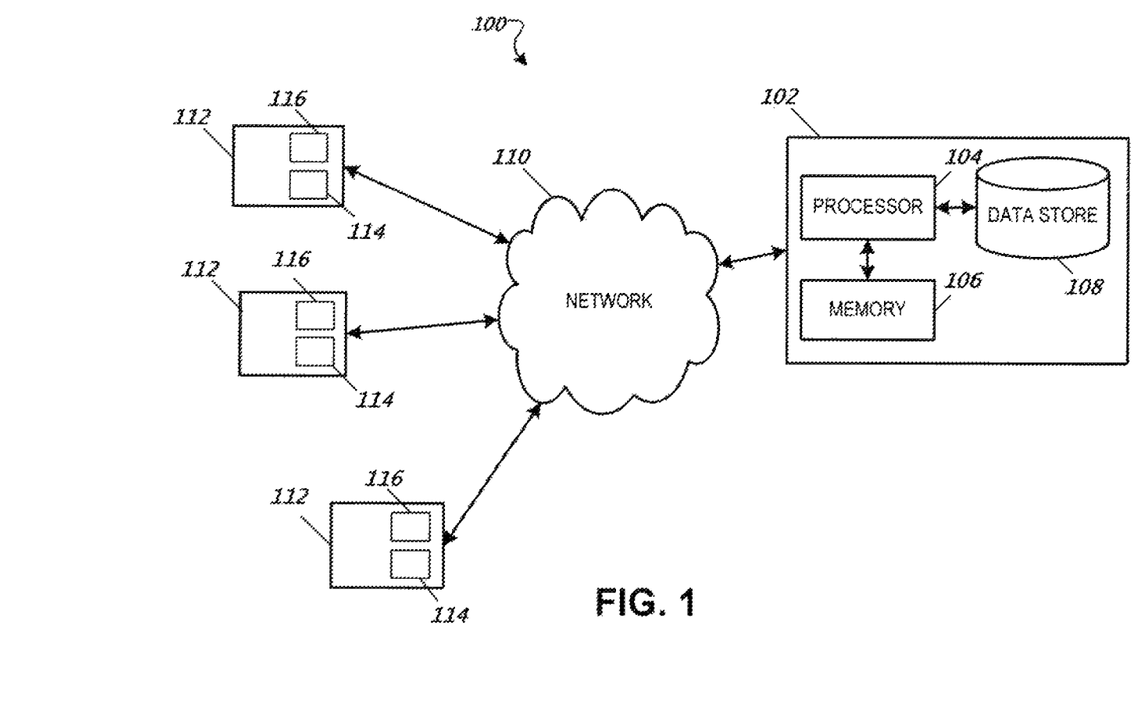
FIG. 1 is an overview of an exemplary network implementation.

FIG. 1 is an example system 100 in which the systems and methods disclosed herein may be implemented. The exemplary system 100 includes a server 102, a network 110, and multiple clients 112. The server 102 may include a processor 104 coupled to a computer readable memory 106, such as a RAM or other data store. The server 102 may also include another data store 108, such as a database or directory. The server 102 may include program instructions executable by the processor 104 to implement various services, such as mail, chat, web, ftp, etc. User data, attribute data, computer data, etc., may be stored in the memory 106 and the data store 108. Although depicted as a single computer system, the server 102 may be implemented as a network of computers.

The server 102 communicates with the clients 112 via the network 110. The network 110 may be a local area network (LAN), wireless LAN, or a wide area network (WAN), such as the Internet. Each client 112 may be associated with one or more users, and may comprise a device capable of communicating over the network 110, such as a computer, a mobile communication device, or other communication device. Each client 112 may include a directory services engine 114 that accesses information contained in, e.g., the data store 108. A managed client service 116 may be provided that executes on the client 112 to administer access privileges and/or preferences for users, groups, or computers under administrative control. Though a client-server configuration is shown, other system configurations are possible including those for provisioning various electronic devices including mobile telephones, personal digital assistants, mobile electronic devices, game consoles, set top boxes, etc.

The data store 108 may include an LDAP (Lightweight Data Access Protocol) directory, such as Open Directory based on OpenLDAP, to provide centralized access to information about users and network resources using directory services. In one implementation, information in a directory domain can be organized by record type. Record types can be specific categories of information, such as users, groups, and computers. For each record type, a directory domain may contain any number of records. Each record can be a collection of attributes, and each attribute can have one or more values. Administrative tools can be executed on the processor 104 to define and manage directory information such as user accounts, access privileges, and computing resources in the directory.

Figure 2:
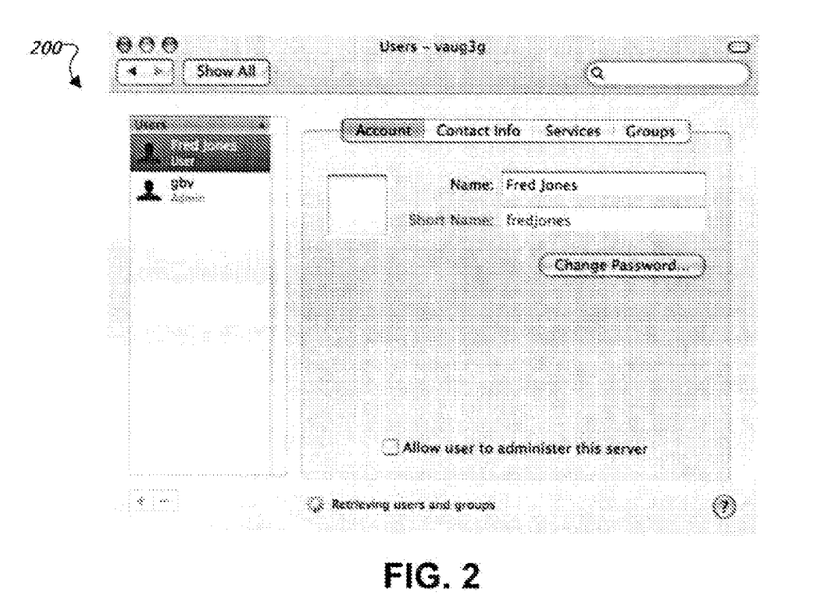
FIGS. 2 and 3 are exemplary administrative graphical user interfaces.

FIG. 2 illustrates a Workgroup Manager graphical user interface tool 200 that is an exemplary administrative tool available from Apple Computer, Inc., as part of the Mac OS X Server administration tools. The Workgroup Manager 200 provides for directory-based management of users and computers in an organization. For example, the Workgroup Manager 200 may be used to create accounts, manage preferences, and create and manage share points, network views, etc. In the Workgroup Manager 200, information about users, groups, and computer lists is integrated with directory services.

Figure 3:
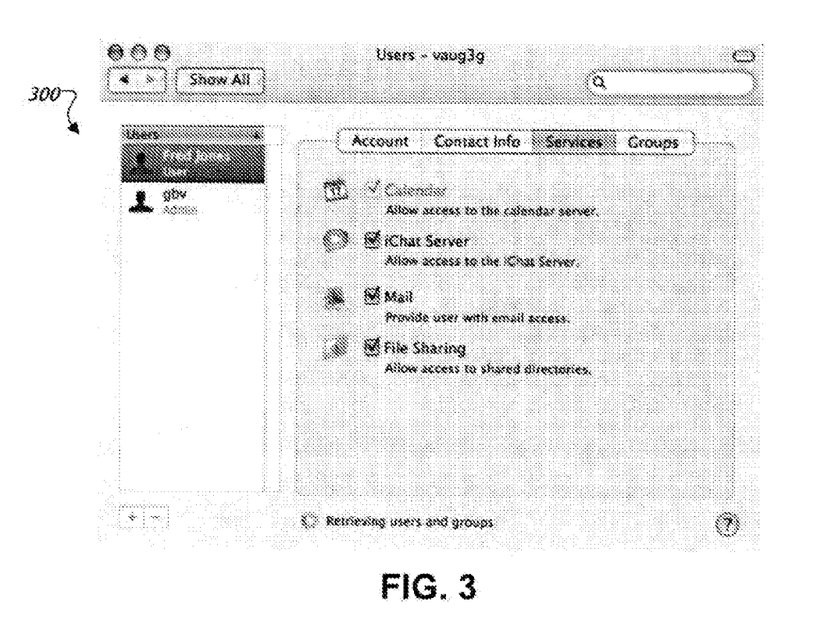

After an administrator sets-up user accounts, preferences are set using a preferences editor, such as that shown in FIG. 3. Conventionally, managing preferences and configuration parameters is a manual process that typically requires the administrator to define settings for certain system preferences, in addition to controlling user access to system preferences, applications, printers, and removable media. Through this conventional process, administrators manually define many of the actions that take place when users log in, such as mounting of shared network resources, use restrictions (e.g., disabling media burning, restricting outgoing email traffic), and authentication requirements (e.g., access to specific devices or printers). Information about settings and preferences can be stored in a directory, such as the LDAP directory of Open Directory master.

Figure 4:
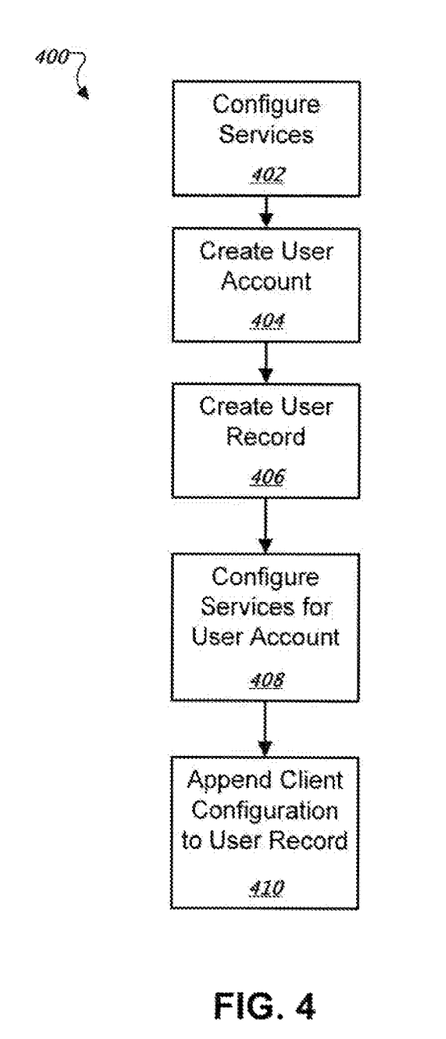
FIG. 4 is a flow chart of exemplary processes that may be performed to automatically create configuration entries.
Figure 5:
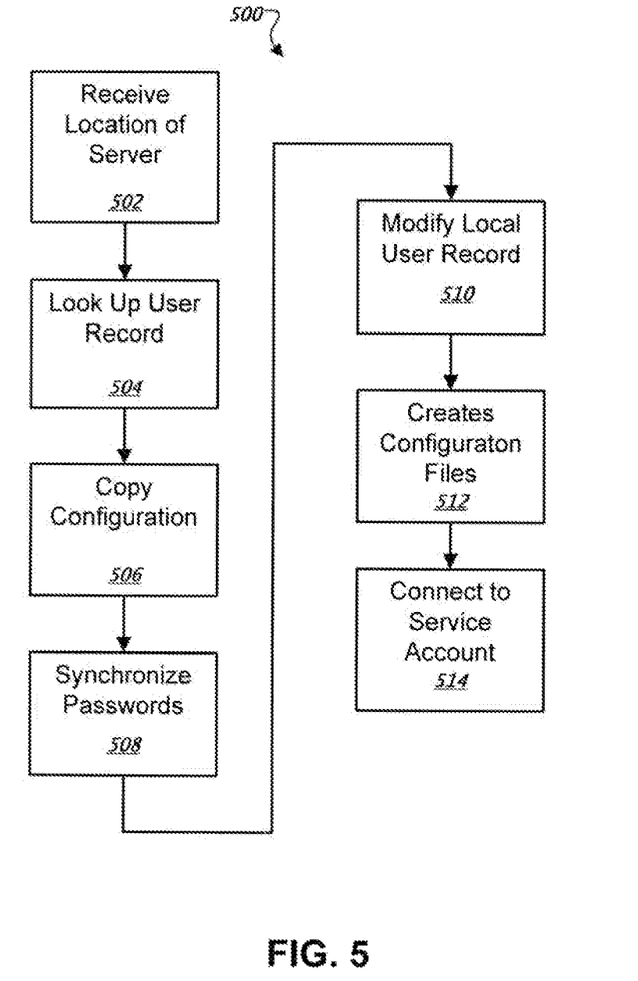
FIG. 5 is a flow chart of exemplary processes that may be performed to configure applications.
Figure 6:
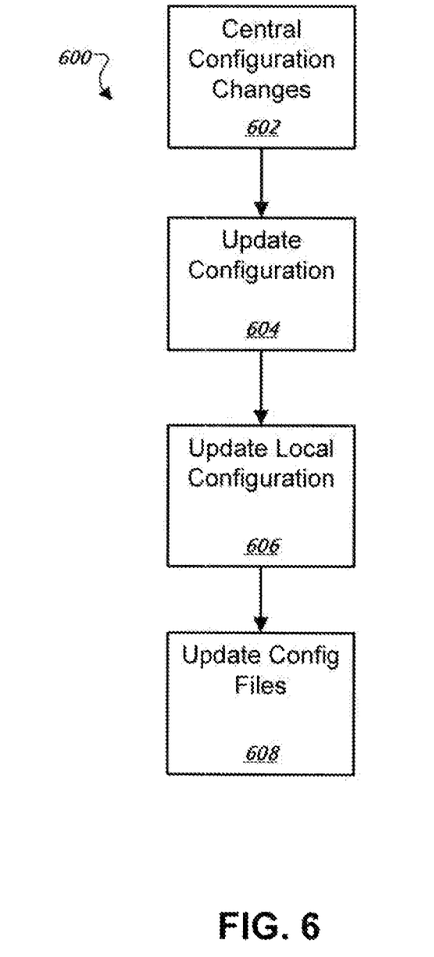
FIG. 6 is a flow chart of exemplary processes that may be performed to update a client application configuration.

FIGS. 4-6 illustrate exemplary processes associated with automatic application provisioning that simplifies defining preferences and settings in environments such as a small business or small workgroup. The automatic application provisioning processes may be performed by a stand-alone application, an application that is part of a server administration application suite, a portion of an operating system, or portion of another application.

In one implementation, the automatic application provisioning processes execute on the server 102 and define settings and preferences for internal "workgroup" services, such as corporate 3-mail and other services. At step 402, a configuration for services is identified. For example, the server 102 may host corporate e-mail and settings, such as a mail server host name (mail.example.com) and IP address (192.168.50.1), the SMTP host name (mail.example.com), POP host name (mail.example.com), IMAP host name (mail.example.com), etc., are defined. The configuration can be written out to service configuration files, which are stored in, e.g., the data store 108. In one implementation, the service configuration files are grouped into subfolders.

At step 404, a user account is created (e.g., on the server 102 via interface 200 provided by the administration tools), and at step 406, a user record is created (e.g., in the directory in data store 108. The settings for the user account, e.g., a short name, a full name, a home directory locations, etc., become values of attributes in the user record. The user record and the values of its attributes can reside in a directory domain.

At step 408, based on the creation of the user account, services are configured for the newly created account to provide access to the services. For example, an e-mail account may be created for the user, etc. At step 410, a client configuration entry is created. In one implementation, the service configuration created at step 402 is read and combined with the client information from step 404 to determine how an application running on, e.g., client 112, will be configured for the newly created user to access a particular service. The client configuration information is saved into the user record created at step 406.

In the e-mail example above, the service configuration may indicate that the mail server is located at mail.example.com. Accordingly, it will be determined that the client e-mail application is to be configured to access the e-mail IMAP and SMTP server at mail.example.com. Other information may be populated such as the user's email address (e.g., user@example.com). In one implementation, the client configuration information and preferences can be placed in the user record as an MCX attribute.

Referring now to FIG. 5, an exemplary process that may be performed after a user has logged on to a device (e.g., the client 112) is shown. At step 502, a server addresses is received (e.g., from a user). In one particular implementation, the directory services engine 114 is launched, either automatically upon login or after a user input, that prompts the user for the location of the service provider (e.g., address of the server 102), and the username and password of the account created at step 404. Such a directory services application may be "Directory Utility" available from Apple Computers, Inc. The directory services access application is aware of configuration data stored at step 410.

At step 504, a look up of the user record is performed (e.g., in the LDAP directory on the server 102 by the directory access engine 114 on the client 112). At step 506, a copy of the configuration records is made (e.g., MCX to local user record). At step 508, any local and network passwords are synchronized. At step 510, the local user record is modified and the user is prompted to logout and login again. For example, the local user record is modified such when the user logs out and back into the client 112, a login process acquires an authentication ticket (e.g., Kerberos) from the server 102. Acquiring the authentication ticket enables client applications executing on the client 112 to transparently connect to the various services (e.g., e-mail, chat, etc.) without further authentication.

At step 512, application-specific configuration files are created. For example, the copy of the configuration records made at step 506 is used to create the application-specific configuration files that are accessed by their respective client applications to access the services on the server 102. At step 510, an application (e.g., e-mail, chat, etc.) is launched (e.g., by the user), and using the configuration files, automatically connects to the appropriate account on the defined mail server. Steps 502-512 of FIG. 5 may be implemented in the managed client service 116 that executes on the client 112.

Referring to FIG. 6, there is shown an exemplary process performed at a point in time after a managed application has been configured by the exemplary process of FIG. 5. At step 602, a change is made to the server configuration (e.g., by the administrator). At step 604, configuration entries are updated in the network user record to reflect the change in step 602. At step 606, the updated configuration is copied to the local user record. For example, an application running on the client 112 sees that the configuration entries have been updated on the server 102, and copies the configuration entries to the local user record. At step 608, the configuration files for the appropriate client applications are update. For example, the managed client service 116 sees the new configuration entries in the local user record and updates the configuration files for appropriate client applications.

Figure 7:
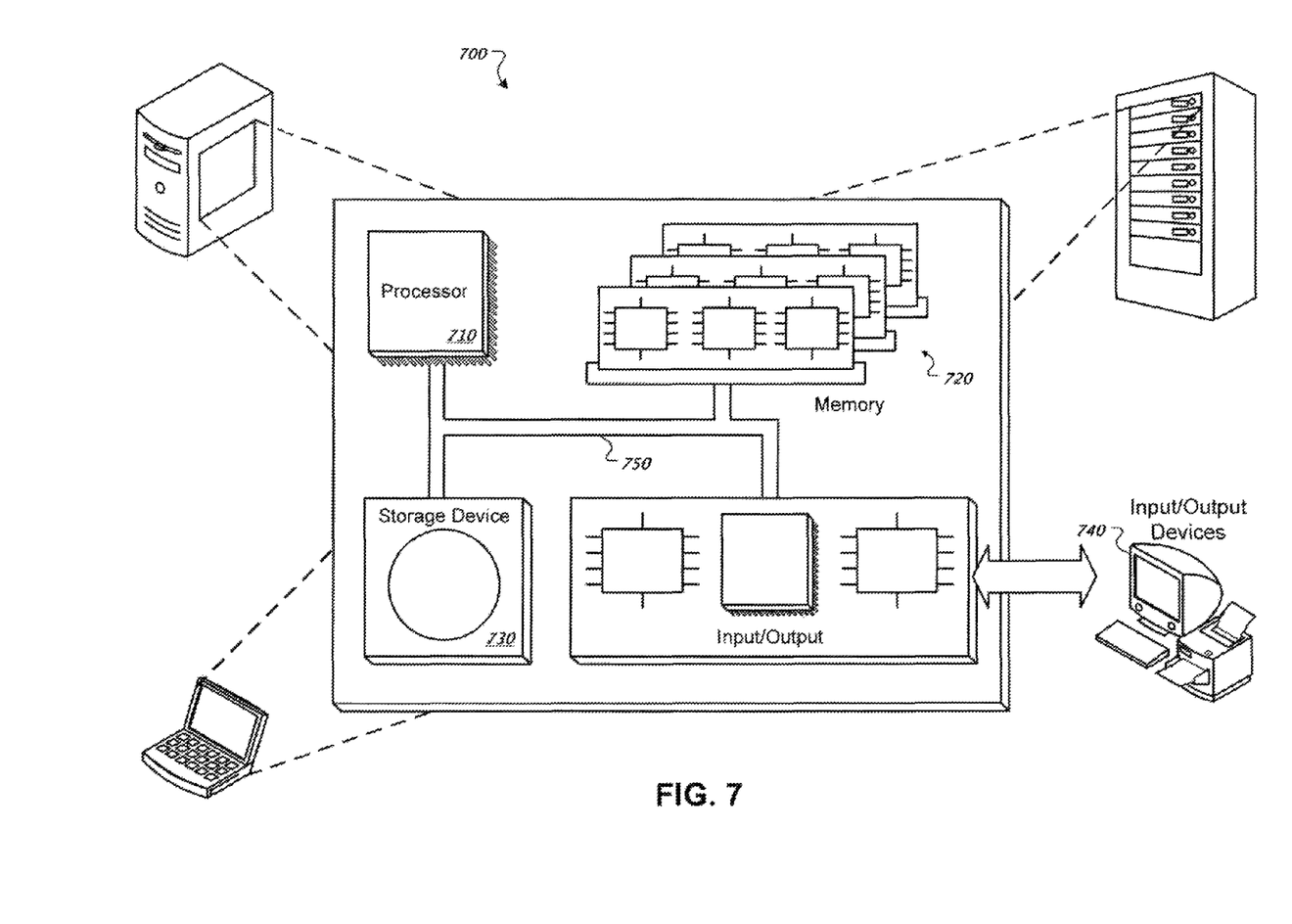
FIG. 7 is a block diagram of an exemplary device environment.

FIG. 7 is a block diagram illustrating a general computer system 700. The system can be used for the operations described above according to one implementation. The system 700 includes a processor 710, a memory 720, a storage device 730, and an input/output device 740. Each of the components 710, 720, 730, and 740 are interconnected using a system bus 750. The processor 710 is capable of processing instructions for execution within the system 700. In one embodiment, the processor 710 is a single-threaded processor. In another embodiment, the processor 710 is a multi-threaded processor. The processor 710 is capable of processing instructions stored in the memory 720 or on the storage device 730 to display graphical information for a user interface on the input/output device 740.

The memory 720 stores information within the system 700. In one embodiment, the memory 720 is a computer-readable medium. In one embodiment, the memory 720 is a volatile memory unit. In another embodiment, the memory 720 is a non-volatile memory unit.

The storage device 730 is capable of providing mass storage for the system 700. In one embodiment, the storage device 730 is a computer-readable medium. In various different embodiments, the storage device 730 may be a floppy disk device, a hard disk device, an optical disk device, or a tape device.

The input/output device 740 provides input/output operations for the system 700. In one embodiment, the input/output device 740 includes a keyboard and/or pointing device. In one embodiment, the input/output device 740 includes a display unit for displaying graphical user interfaces.

The invention can be implemented in digital electronic circuitry, or in computer hardware, firmware, software, or in combinations of them. Apparatus of the invention can be implemented in a computer program product tangibly embodied in an information carrier, e.g., in a machine-readable storage device or in a propagated signal, for execution carrier, e.g., in a machine-readable storage device or in a propagated signal, for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the invention can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The invention can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of embodiments of the invention have been described. Nevertheless, it will be understood that various modifications may be made without departing from the spirit and scope of the invention. For example, alternative directories and repositories may be used to centrally manage user information. Accordingly, other embodiments are within the scope of the following claims.

What is claimed is:

1. A method, comprising:

storing predetermined service information on a server, where the service information includes information for configuring services for a plurality of users and where the service information does not include information specific to a particular user;

creating, on the server, a user record in response to the creation of a user account for a user, the user record including user-specific information;

automatically provisioning user-specific configuration information on the server for services associated with the user account by combining the predetermined service information with the user-specific information, where the user-specific configuration information determines how services accessed using respective applications running on a particular client will be configured on the client for the user in order to provide user access to the services;

appending the user-specific configuration information to the user record;

storing the user record on the server;

receiving a request at the server from the client for the configuration information of the user; and copying the configuration information from the user record to the client.

2. The method of claim 1, further comprising:
synchronizing passwords between the server and the client.

3. The method of claim 1, further comprising:
receiving a connection request for services at the server based on the user-specific configuration information.

4. The method of claim 1, further comprising:
storing the user record in a LDAP directory; and
storing the user-specific configuration information as an attribute in the user record.

5. The method of claim 1, where workgroup services are automatically configured for the user based on the user-specific configuration information.

6. The method of claim 1, wherein the services include one or more of e-mail and chat.

7. A non-transitory computer-readable medium including one or more sequences of instructions which, when executed by one or more processors, causes:

storing predetermined service information on a server, where the service information includes information for configuring services for a plurality of users and where the service information does not include information specific to a particular user;

creating, on the server, a user record in response to the creation of a user account for a user, the user record including user-specific information;

automatically provisioning user-specific configuration information on the server for services associated with the user account by combining the predetermined service information with the user-specific information, where the user-specific configuration information determines how services accessed using respective applications running on a particular client will be configured on the client for the user in order to provide user access to the services;

appending the user-specific configuration information to the user record;

storing the user record on the server;

receiving a request at the server from the client for the configuration information of the user; and     copying the configuration information from the user record to the client.

8. The non-transitory computer-readable medium of claim 7, wherein the instructions cause:

synchronizing passwords between the server and the client.

9. The non-transitory computer-readable medium of claim 7, wherein the instructions cause:

receiving a connection request for services at the server based on the user-specific configuration information.

10. The non-transitory computer-readable medium of claim 7, wherein the instructions cause:

storing the user record in a LDAP directory; and storing the user-specific configuration information as an attribute in the user record.

11. The non-transitory computer-readable medium of claim 7, where workgroup services are automatically configured for the user based on the user-specific configuration information.

12. The non-transitory computer-readable medium of claim 7, wherein the services include one or more of e-mail and chat.

13. A system comprising:

one or more hardware processors; and a non-transitory computer-readable medium including one or more sequences of instructions which, when executed by the one or more hardware processors, causes:

storing predetermined service information on a server, where the service information includes information for configuring services for a plurality of users and where the service information does not include information specific to a particular user;

creating, on the server, a user record in response to the creation of a user account for a user, the user record including user-specific information;

automatically provisioning user-specific configuration information on the server for services associated with the user account by combining the predetermined service information with the user-specific information, where the user-specific configuration information determines how services accessed using respective applications running on a particular client will be configured on the client for the user in order to provide user access to the services;

appending the user-specific configuration information to the user record;

storing the user record on the server;

receiving a request at the server from the client for the configuration information of the user; and     copying the configuration information from the user record to the client.

14. The system of claim 13, wherein the instructions cause: synchronizing passwords between the server and the client.

15. The system of claim 13, wherein the instructions cause:

receiving a connection request for services at the server based on the user-specific configuration information.

16. The system of claim 13, wherein the instructions cause:

storing the user record in a LDAP directory; and storing the user-specific configuration information as an attribute in the user record.

17. The system medium of claim 13, where workgroup services are automatically configured for the user based on the user-specific configuration information.

18. The system of claim 13, wherein the services include one or more of e-mail and chat.

\* \* \* \* \*